US007050483B2

(12) United States Patent
Shi et al.

(10) Patent No.: US 7,050,483 B2
(45) Date of Patent: May 23, 2006

(54) LOW-COST TWO-STAGE RECEIVER SYSTEM FOR DS-CDMA

(75) Inventors: Qicai Shi, Coral Springs, FL (US); Stephen R. Korfhage, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 826 days.

(21) Appl. No.: 10/022,791

(22) Filed: Dec. 13, 2001

(65) Prior Publication Data

US 2003/0112854 A1 Jun. 19, 2003

(51) Int. Cl.
*H04B 1/69* (2006.01)
(52) U.S. Cl. ..................................... 375/147
(58) Field of Classification Search ............... 375/130, 375/147, 316, 340, 335, 342, 441; 341/108, 341/110, 126, 155

See application file for complete search history.

(56) References Cited

U.S. PATENT DOCUMENTS

| 5,991,279 | A  | * | 11/1999 | Haugli et al. ............... 370/311 |
| 6,157,820 | A  | * | 12/2000 | Sourour et al. ........... 455/226.2 |
| 6,515,981 | B1 | * | 2/2003  | Schilling et al. ............ 370/242 |
| 2002/0141487 | A1 | * | 10/2002 | Bradley ....................... 375/148 |
| 2003/0069025 | A1 | * | 4/2003  | Hoctor et al. ............... 455/456 |

* cited by examiner

*Primary Examiner*—Robert Pascal
*Assistant Examiner*—Krista Flanagan

(57) ABSTRACT

A method and apparatus for receiving and processing a DS-CDMA signal in accordance with a two-stage process. The first stage comprises signal detection and employs a correlation between the sampled incoming waveform and a pseudo-noise code sequence. This stage is performed in real-time. Once a signal has been detected, a burst of the sampled incoming waveform is collected and then post-processed to recover the incoming information. The method may be implemented at low-cost on a general-purpose digital signal processor. The invention is especially suitable for DS CDMA location systems, where low-cost and low power consumption are desirable.

24 Claims, 4 Drawing Sheets

LOW-COST TWO-STAGE RECEIVER SYSTEM FOR DS-CDMA

TECHNICAL FIELD

This invention relates to techniques and apparatus for receiving Direct Sequence (DS) CDMA signals. This invention is especially suitable for DS CDMA location systems where low-cost and low power consumption are desirable.

BACKGROUND OF THE INVENTION

For Direct Sequence Code Division Multiple Access (DS-CDMA) location systems, the transmitter may be turned on only several times per day, and may broadcast only a few frames of data. Additionally, the frame may be very short (200 bits per frame for example). Consequently, the transmitter is quiet for most of the time. However, in order to avoid missing any signal, a typical receiver will continuously perform a real-time correlation between a known pseudo-noise (PN) sequence and the input signal, as if a signal transmission were present. From the results of the correlation, a determination is made as to whether or not a signal is present, and whether the signal should be processed further. The correlation process constitutes a large proportion of the total processing required to demodulate and extract the data from the input signal. Thus, a great deal of processing is being done, even if no signal is present.

The correlation process requires a large amount of processing power in this type of receiver configuration, and must be performed in real-time. Consequently, the processing is typically performed using specialized hardware rather than a general purpose digital signal processor (DSP).

For a "burst" application, such as that in a location system, real-time processing to demodulate and extract the data is not required, provided that the incoming data can be stored for later processing. The amount of incoming data is very large, so it is preferable that signal detection is performed so as to identify which portions of the incoming system should be stored.

There is therefore a need in the art for a signal detection system that can operate in real-time with a reduced processing requirement.

Further, if the signal detection and data demodulation/extraction can be performed in software on a DSP, a simpler, lower cost receiver can be designed.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
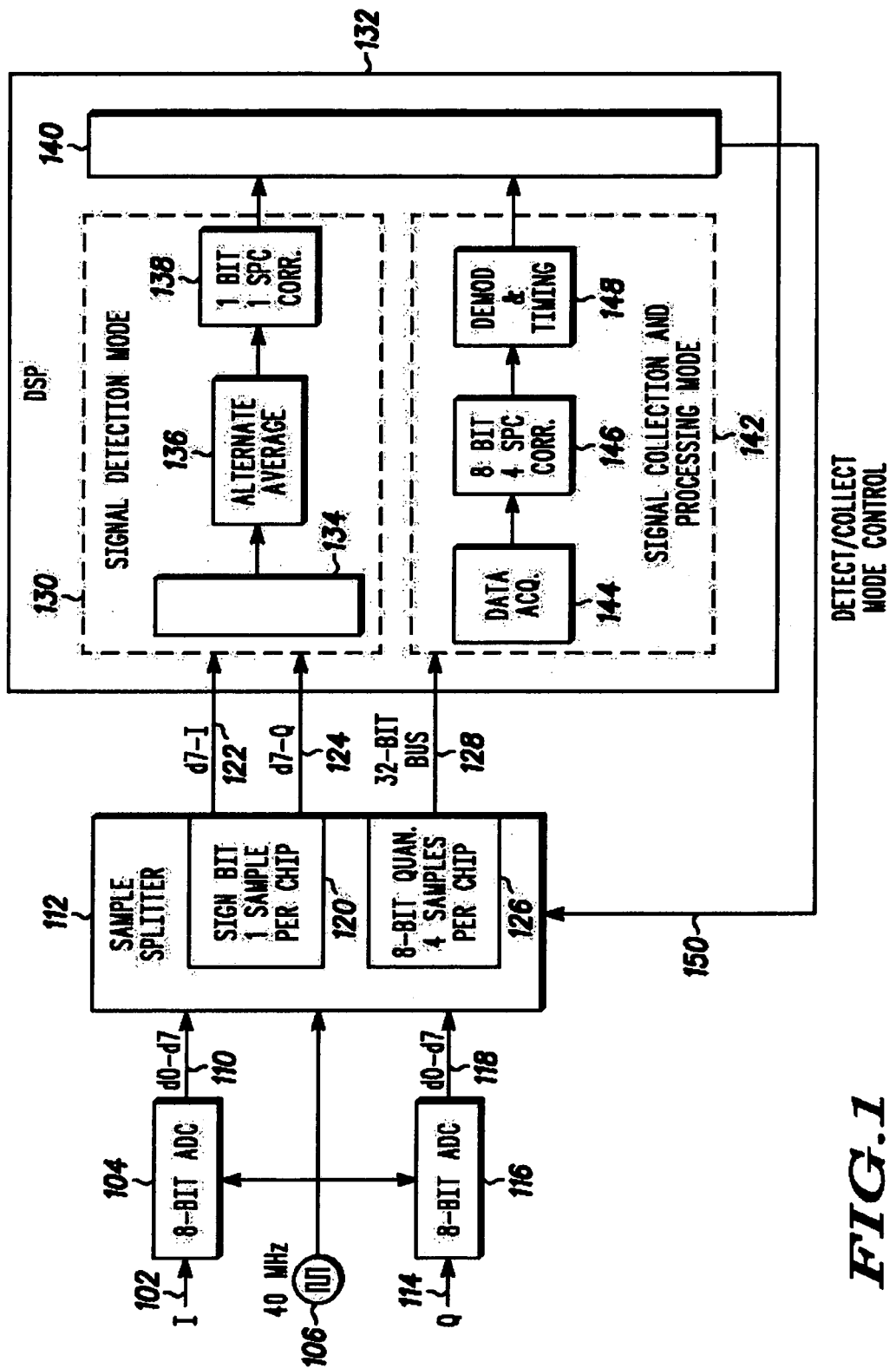
FIG. 1 is a block diagram of an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

This invention relates to a low-cost, two-stage receiver system for DS-CDMA signals. The first stage is signal detection with less quantizing bits per sample and less sampling points per chip information; the second stage is signal demodulation and extraction with full information. The receiver system may be implemented in software on a low-cost DSP or other suitable processor/controller.

FIG. 1 is a block diagram of a DS-CDMA receiver in accordance with an embodiment of the present invention, and illustrates how incoming in-phase (I) and quadrature (Q) waveforms are used by a DSP to first perform signal detection and then perform sample collection of received signal burst. Referring to FIG. 1, incoming in-phase (I) waveform 102 is received by analog-to-digital converter (ADC) 104. In the example embodiment shown in the figure, an 8-bit ADC is used, but ADCs of different resolution may be used depending upon the ratio of signal to noise in the waveform. The sampling rate of the ADC 104 is set by sample clock 106. In this example, the sample clock is operated at 40 MHz, which corresponds to four times the chip rate. The output 110 from the ADC 104, which comprises bits d0–d7 of the digital sample, is passed to sample splitter 112. Similarly, the quadrature (Q) waveform 114 is received by analog-to-digital converter (ADC) 116 that in turn produces an 8-bit digital output 118. The 8-bit digital output 118 is passed to the sample splitter 112.

As an alternative to using two ADCs, the in-phase and quadrature waveforms may be passed to a two-into-one multiplexer followed by a single ADC.

The sample splitter 112 includes a 1-bit quantizer 120 that samples the inputs at 1 sample per chip with 1-bit resolution. In this example, the 1-bit quantization is obtained by selecting the most significant bit (MSB) d7 of the input This approach avoids the need for explicit 1-bit sampling. This results in a 1-bit bit-stream 122 at 1 sample per chip (1 SPC) for the I-channel and a 1-bit bit-stream 124 at 1 SPC for the Q-channel.

Additionally, the 8-bit samples from the ADCs are buffered in module 126. Four samples (two from the I-channel and two from the Q-channel) are passed together to a 32-bit bus 128. Other data configurations may be used without departing from the present invention.

The bit-streams 122 and 124, for the I- and Q-channels respectively, are passed to a digital signal processor (DSP) 132. When the DSP is in a signal detection mode, as indicated by box 130, the bit-streams are stored in a buffer 134. The buffer 134 is configured to hold 2N bits (where N=10 in this example) of data. Once the first half of the buffer is full, the bit-stream will start to fill the second half of the buffer, and the data in the first half of the buffer will be moved away and processed. Once the second half of the buffer is full, the bit-stream will start to fill the first half of the buffer, and the data in the second half of the buffer will be moved away and processed. This process in repeated while the DSP remains in signal detection mode.

Figure 2A:
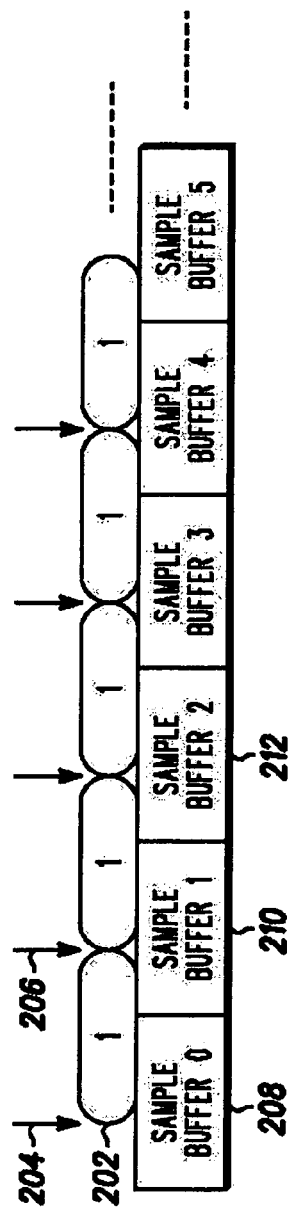
FIG. 2 is a diagrammatic representation of data storage in accordance with an embodiment of the present invention.
Figure 2B:
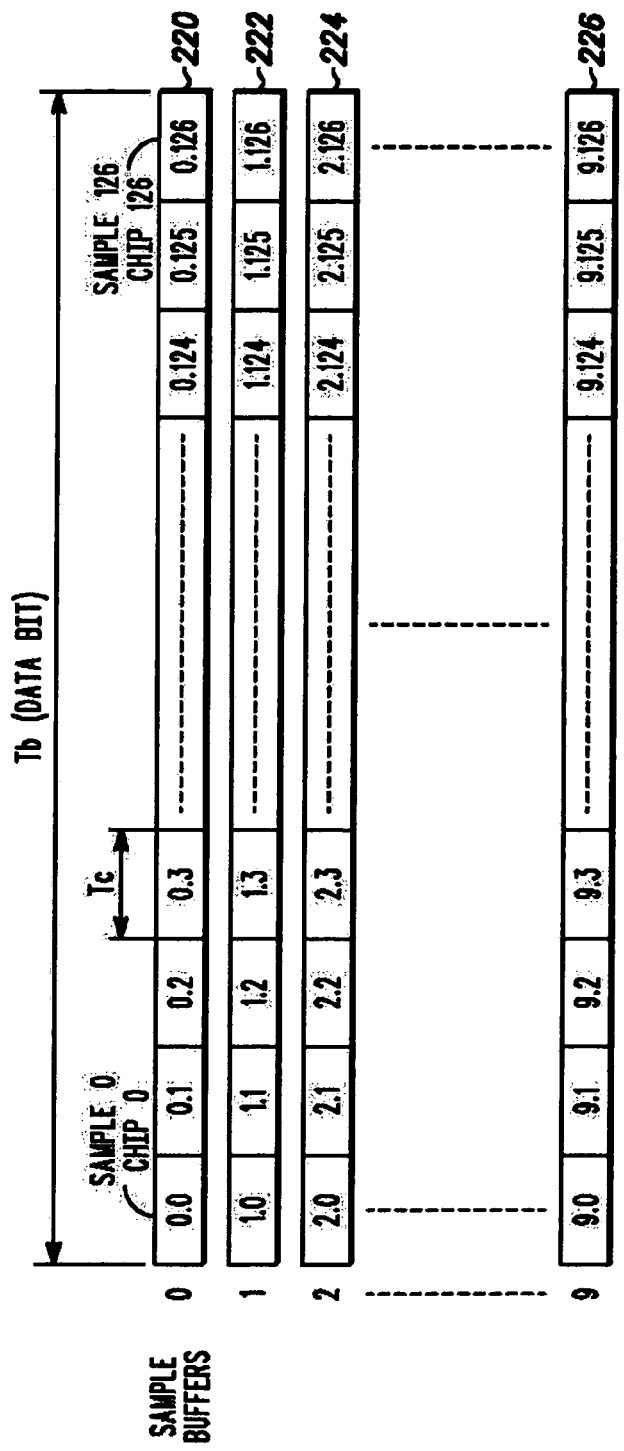

The data buffering is shown in more detail in FIG. 2A and FIG. 2B. FIG. 2A depicts an incoming data stream 202 containing a sequence of bits of data, each bit being represented as a sequence of chips (127 chips in this example). For purposes of example, we describe 127 chips; however, one of ordinary skill in the art will recognize that the present invention may be applied to any number of chips, up to and including, but not limited to, 512 or more chips. The data is stored into a series of sample buffers 208, 210, 212 etc. Only 6 of the N storage buffers are shown in the figure. Each sample buffer stores 127 samples (each sample being a chip). The incoming bits are generally spread across two adjacent buffers, so the correlation peaks 204, 206 etc., which occur at the beginning of each bit, occur part way through each sample buffer.

A more detailed representation of the sample buffers is shown in FIG. 2B. The buffers are filled from top left to bottom right in the diagram. The sample buffer 0 (220) is filled with the first 127 samples, sample buffer 1 (222) with the next 127 samples, sample buffer 2 (224) with the next 127 samples and so on until sample buffer 9 (226) is filled. The data is then ready for processing. The buffer, 134 in FIG. 1, contains 20 sample buffers, each buffer holding the 127 chips representing 1-bit. The time taken to fill each sample buffer is Tb, the bit-period. The duration of each chip is Tc. In the figure, the $n^{th}$ sample c(n) is stored in the location denoted by p.k, where M=127 is the PN code length. p is the integer part or portion of n/M; k is the remainder part or portion of n/M.

Referring again to FIG. 1, the N-bits of data taken from the first half of the buffer 134 are coherently added at 136. For example, if the pseudo-noise (PN) sequence has length 127 samples, then samples 0, 127, 254, ..., 127*(10−1) are added together, samples 1, 128, 255, ..., 127*(10−1)+1 are added together etc. In general, if the PN sequence has length M and P averages are taken, the $k^{th}$ coherent sum is $$sum(k) \sum_{p=0}^{P-1} c(k+Mp),$$

where c(n) is the $n^{th}$ sample. This corresponds to summing the $k^{th}$ column of samples in FIG. 2B. There are two reasons for performing averaging: to increase signal to noise ratio and to reduce the processing requirement for the DSP. At this point the averaged data contains 127 samples. These may be further quantized to 1-bit and stored as 4 32-bit words (or 8 16-bit words if a 16-bit DSP is used). The number of averages, P, may typically be equal to or less than 30, although this is not a requirement of the invention.

In the example described above, the incoming bits were assumed to be repeated. In an alternative embodiment, the incoming bits are assumed to have a predetermined bit pattern such as that in a training sequence. In this case the coherent average is calculated as $$sum(k) = \sum_{p=0}^{P-1} c(k+Mp)pn(k,b(p)),$$

where b(p) is the value of the $p^{th}$ bit in the training sequence and pn(k,b(p)) is the $k^{th}$ value of the pseudo-noise code for the bit b(p). Since the starting point of the sequence will not be known in general, the sum is preferably calculated every time a new bit (M samples) is received.

A PN code with a length of 127 samples can be stored in 4 32-bit words in the DSP. Since only 1-bit of resolution is used, the correlation operation at 138 effectively counts the number of bit positions that match between the PN code and the incoming data being correlated. The DSP can perform the correlation by performing an exclusive-or operation, the result of which will indicate bit positions that differ. The exclusive-or operation can be performed on each of the 4 32-bit sample words, the results will have bits set in positions which did not match. These mismatched positions are counted, yielding the total number of mismatched positions. The counting may be performed via a look-up table, so as to reduce computation. Subtracting the number of mismatched bits from the maximum possible number of matches gives the number of matches, which is equal to the correlation output for that iteration. Equivalently, the result of the exclusive-or operation can be inverted (using a bit-wise NOT operation). The sum of the bits then indicates the number of bits that matched and equals the correlation. This correlation is performed at 138.

Since the starting point of the sequence will not be known in general, the correlation is done between the averaged sequence and all the cyclic shift versions of the PN sequence.

The correlation output is passed to signal processing and control module 140, where the correlation output is compared to a pre-determined threshold. Once the correlation output passes a pre-determined threshold, the DSP declares that a signal has been received and switches to acquisition mode, where the 1-bit data stream is abandoned and the 8-bit sample stream is used. Since the 1-bit samples are only used for signal detection, they are discarded. Once the signal has been detected, the sample splitter may be signaled via control line 150 to indicate that the mode has changed from detection mode to collection mode.

After the signal detection algorithm indicates that a signal is present the DSP switches to signal collection and processing mode as illustrated by box 142 in FIG. 1. The first stage is data acquisition 144. In this stage the DSP simply collects the 8-bit I and Q samples from the 32-bit bus 128 and saves them into memory. No significant processing is done at this stage, since the high sample rate would require a very powerful DSP. In a DS-CDMA location system, the total transmission and time of a signal burst is known, so the DSP simply collects enough samples to ensure that the whole transmitted burst is collected. Once the required number of samples has been collected, the DSP can begin processing the transmitted burst. The DSP then stops receiving input from the ADCs and begin performing full signal processing on the collected samples. This stage of the processing need not be performed in real-time, so a very powerful DSP is not required. The processing comprises correlation of the incoming samples with the stored PN code at 146, followed by demodulation and timing at 148. In this example, the incoming waveforms are sampled at four times the chip rate. Hence 4 8-bit correlations are performed per chip for each channel. The 4 correlations allow module 148 to synchronize the timing between the PN code and the incoming signal more accurately. The results are passed to signal processing and control module 140, where further processing may be performed before the data is passed to a host processor. The DSP then returns to the signal detection mode.

Figure 3:
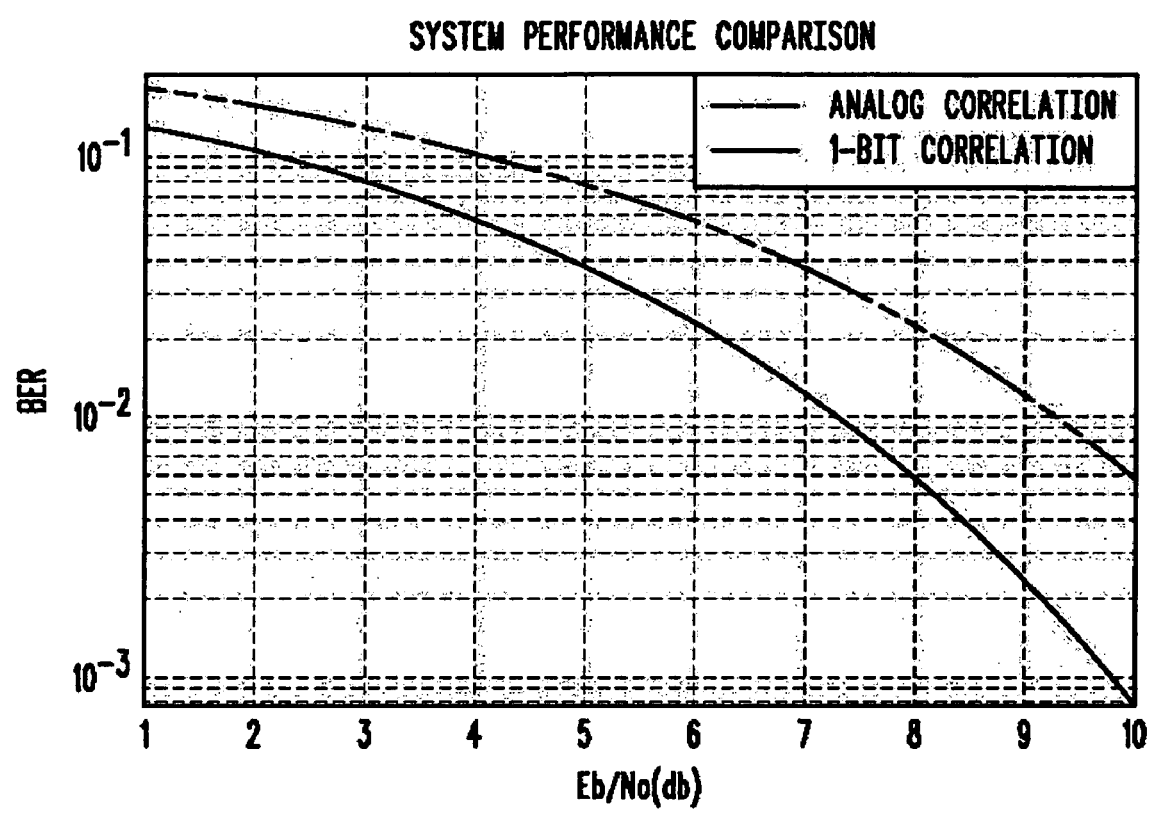
FIG. 3 is a graph showing the effect of signal-to-noise ratio on bit error rates.

An important feature of the present invention is the ability to detect an incoming signal based upon a certain correlation, such as upon a 1-bit correlation. The performance of this approach compared with a full analog correlation was determined via computer simulation. The results are shown in the exemplary graph in FIG. 3. The graph shows a plot of the bit error rate (BER) as a function of the signal to noise ratio (SNR). The SNR is calculated as Eb/No measured in decibels (dB), where Eb is the energy of a bit and No is the noise level. The 1-bit correlation shows a loss equivalent to 2 dB SNR compared with the analog correlation.

Exemplary code for performing a correlation on 1-bit data follows. It is noted and will be understood by those of ordinary skill in the art that the following 1-bit correlation process is meant as an exemplary embodiment and should not be interpreted as limiting the present invention to 1-bit correlation. Any type of correlation data sufficient to meet the timing requirements required for desired signal detection may be employed.

```
unsigned int buffer[5]; /* buffer for 128 bits + 32 new bits */
extern const unsigned int pn[5]; /* 128 bit length PN code     */
extern const int bitCount[256]; /* table for counting bit matches */
void oneBitCorr(int corrOut[32], unsigned int newSamples)
{
unsigned int matches[4];
int i,j,sum;
    /* add new samples to end of buffer */
    buffer[5] = newSamples;
    for(i=0;i<32;i++)
    {
        /* shift 128 input buffer left one bit */
        for(j=0;j<4;j++)
            buffer[i] = (buffer[j]<<1) | ((0x80000000 & buffer[j +1]) ? 1:0);
        buffer[j]<<=1;
        /* correlate PN code to input samples, save number of bit matches */
        for(j=0;j<4;j++)
            matches[j] = ~(pn[i]^buffer[j]);
        /* count number of matches between input samples and PN sequence
         * bitCount[] is a 256 entty table where entry "i" contains the
         * number of bits that are set in value "i". For example,
         * bitCount[0] = 0 and bitCount[7F] = 7, etc.
         */
        for(j=0,sum=0; j<4; j++)
        {
            sum += bitCount[(matches[j] & 0x000000FF)>>0];
            sum += bitCount[(matches[j] & 0x0000FF00)>>8];
            sum += bitCount[(matches[j] & 0x00FF0000)>>16];
            sum += bitCount[(matches[j] & 0xFF000000)>>24];
        }
        corrOut[i] = sum; /* save correlation output */
    }
    return;
}
```

The coherent averaging described above can be used to compensate for the 2 dB SNR loss. For example, averaging over 10-bits produces a gain of 10 dB SNR, which more than compensates for the 2 dB SNR loss. A incoming signal with 10 dB SNR will result in a 1-bit correlation with a 18 dB SNR, which is easily detected.

The averaged data contains 127 samples. This is correlated with each of the 127 circular shifts of the PN code. Each bit is averaged 10 times, so the available processing time is 10*127*Tc, where Tc is chip duration. For example, if the chip rate is Rc=10 MHz, then Tc=0.1 μs and one correlation must be performed in less than 10Tc=1 μs. In other words it takes 10Tb to fill the each half of the buffer, where 1/Tb is the bit rate, and the processing must be completed before the next half of the buffer is filled. The 127 correlations must be completed in less than 10Tb/127=10Tc seconds. Although this is a relatively short period of time, the correlations may be performed in very few operations by making use of the exclusive-or operation.

In an example implementation, the incoming sample data are quantized into 1-bit samples and processed via software with a DSP processor. Using 1-bit samples allows the DSP in this example to perform correlation of the 1-bit samples at an average rate of about 83 nano-seconds per correlation output, or 2.65 micro-seconds per 32 correlation outputs.

Either the I-channel or the Q-channel can be correlated, or both channels can be correlated and the correlation values summed. In the latter case, 166 nanoseconds are required for the processing.

In order to enable coherent averaging with a known training sequence, the 1-bit correlations may have to be computed every M samples rather than every M*10 sample. The processing time is then 830 nanoseconds, which is still less than the 1 μs available to perform a full correlation.

The algorithm could be implemented in hardware or on a DSP.

The invention provides a method for detecting and decoding DS-CDMA signals requiring reduced processing. As a consequence, cheaper hardware may be used and less electrical power is consumed.

Figure 4:
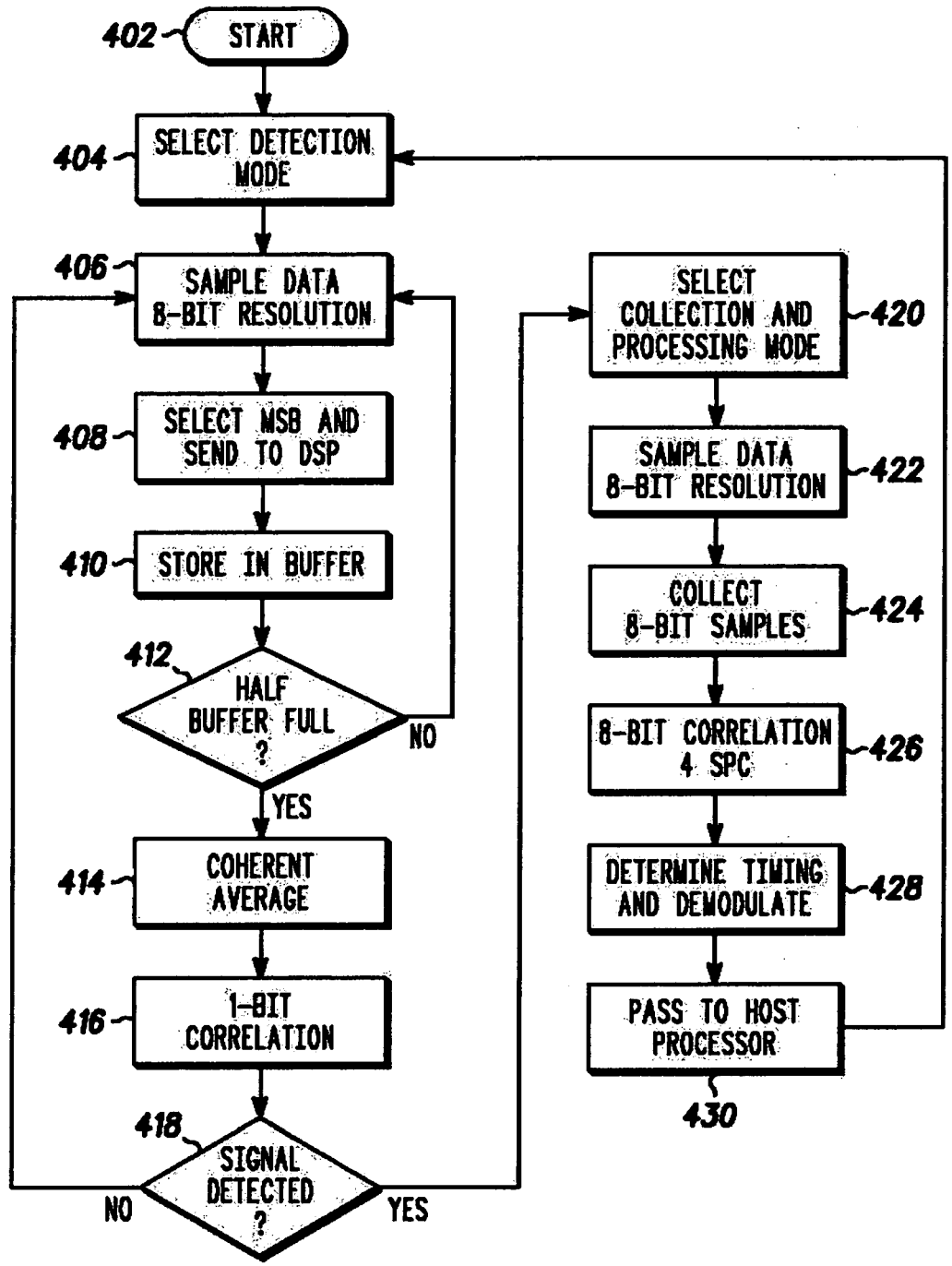
FIG. 4 is a flow chart depicting an embodiment of the method of the present invention.

A flow chart depicting the method of the invention is shown in FIG. 4. Following start block 402, the signal detection mode is selected at block 404. At block 406, the input I- and Q-channel waveforms are sampled with 8-bit resolution. Other resolutions may be used, resulting in different signal-to-noise ratios. The sampling rate is at least one sample per chip and preferably more samples per chip, so that a more accurate time-alignment may be made later. At block 408, the most significant bit (MSB) of the sampled data is selected from each channel and sent to the processor, which is preferably a DSP. In the preferred embodiment, only one MSB per chip is used, so as to minimize computation. The 1-bit data (the MSBs) is stored in a buffer at block 410. The buffer is preferably internal to the DSP, but may be an external memory. In the preferred embodiment, the buffer stores 2N bits of information, each bit being represented by M chips. At decision block 412, a check is made to determine if one half of the buffer is full. If not, as depicted by the negative branch from decision block 412, flow returns to block 406 and more data is collected. If one half of the buffer is full, as depicted by the positive branch from decision block 412, flow continues to block 414, where a coherent average of N consecutive bits is made for each of the M chips. At block 416 a 1-bit correlation with the stored pseudo-noise (PN) code is performed, preferably by using an exclusive-or operation and determining the number of bits matching between the 1-bit samples and the PN code. At decision block 418, the correlation output is compared with a predetermined threshold to determine if a signal is present. If not, as depicted by the negative branch from decision block 418, flow returns to block 406 and more data is collected. If the correlation output exceeds the predetermined threshold, as depicted by the positive branch from decision block 418, flow continues to block 420, where the processor switches to collection and processing mode. Signal detection can be performed using the I-channel, the Q-channel or both channels together. In collection and processing mode, the I and Q-channel waveforms are sampled with 8-bit resolution at block 422 and at block 424 the 8-bit samples are passed to the DSP where they are collected. Sufficient samples are collected that the complete burst of incoming signal is stored for processing. The 8-bit samples may be continuously stored in a circular buffer, even during the signal detection mode. This prevents data from the start of a transmission from being lost. At block 426, the 8-bit I and Q samples are correlated with the PN code. If over-sampling of the input is used, for example 4 samples per chip, then the correlations are calculated for each sample. At block 428 the correlation outputs are used to time-align the incoming signal with the PN code sequence and the signals are demodulated to recover the transmitted data. At block 430, the recovered data is passed to a host processor for further processing. Flow then returns to block 404, where the signal detection mode is again selected and the whole process repeated.

Those of ordinary skill in the art will recognize that the present invention has been described in terms of exemplary embodiments based upon use of a programmed processor forming a part of the DS-CDMA receiver. However, the invention should not be so limited, since the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention. Moreover, the invention should not be restricted to the use of 1-bit per sample, MSB, or 1 sample per chip for signal detection. These values are exemplary and thus not intended to be restrictive of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for receiving a DS-CDMA signal having in-phase and quadrature component waveforms each modulated by a pseudo-noise code of length M chips so that M chips, with each chip of the M chips having one or more data samples that are each comprised of one or more quantized bits, represent one information bit, said method comprising;

converting said in-phase component waveform into a first sequence of data samples;

converting said quadrature component waveform into a second sequence data samples;

selecting one or more data samples of each of the M chips and one or more quantized bits from each selected data sample from the first or second sequence of data samples to obtain a data sequence;

processing said data sequence to determine if a signal is present in the DS-CDMA signal; and if a signal is present:

collecting a predetermined number of samples from said first and second sequences of data samples; and decoding a predetermined number of samples from said first and second sequences of data samples to recover information from the DS-CDMA signal;

wherein said first and second sequences of data samples are stored continuously in a circular buffer until a signal is detected in the DS-CDMA signal and a predetermined number of samples from said first and second sequences of data samples have been collected.

2. A method as in claim 1, wherein said processing said data sequence to determine if a signal is present comprises:

coherently averaging said data sequence over one or more information bits to obtain an averaged data sequence of length M chips;

correlating said averaged data sequence with a pseudo-noise code sequence of length M to obtain a correlation output; and comparing said correlation output with a predetermined threshold level to determine if a signal is present in the DS-CDMA signal.

3. A method as in claim 2, wherein the $n^{th}$ element of said data sequence is denoted by $c(n)$ and wherein said coherently averaging comprises;

calculating the sums $$\sum_{p=0}^{P-1} c(k + M \cdot S \cdot p),$$

wherein P is the number of averages, S is the number of samples per chip, M is the number of chips per information bit, k is the remainder portion of n/(MS) and p is the integer portion of n/(MS); and quantizing each sum to the one or more quantized bits.

4. A method as in claim 3, wherein the number of averages, P, is equal to or less than 30.

5. A method as in claim 2, wherein said correlating said averaged data sequence with a pseudo-noise code comprises;

storing said averaged data sequence as a data bit pattern;

storing said pseudo-noise sequence as a pseudo-noise bit pattern;

performing a bit-wise "exclusive-or" operation between said data bit pattern and said pseudo-noise bit pattern; and calculating, from the result of said "exclusive-or" operation, the number of bits that match between said data bit pattern and said pseudo-noise bit pattern.

6. A method as in claim 5, wherein said calculating from the result of said "exclusive-or" operation the number of bits that match between said data bit pattern and said pseudo-noise bit pattern is performed by use of a lookup table.

7. A method as in claim 1, wherein said convening said in-phase component waveform into a first sequence of data samples and said converting said quadrature component waveform into a second sequence of data samples are performed by first and second analog-to-digital converters.

8. A method as in claim 1, wherein said convening said in-phase component waveform into a first sequence of data samples and said converting said quadrature component waveform into a second sequence data samples are performed by a two-into-one multiplexer followed by an analog-to-digital converter.

9. A method as in claim 1, wherein said in-phase and quadrature waveforms are sampled at a rate of XRc, wherein Rc is the chip rate in the DS-CDMA signal and X is the number of samples per chip.

10. A method as in claim 1, wherein said first and second sequences of data samples are multiplexed together, packed into x8-bit words and passed to a processor for decoding.

11. A method as in claim 1, wherein said processing said data sequence to determine is a signal is present in the DS-CDMA signal and said decoding a predetermined number of samples from said first and second sequences of data samples to recover information from to DS-CDMA signal is performed on a digital signal processor.

12. A method as in claim 1, wherein said decoding comprises:
correlating said predetermined number of samples from said first and second sequences of data samples with a pseudo-noise sequence to obtain a plurality of correlation values; and
determining the information in the DS-CDMA signal from said plurality of correlation values.

13. A method as in claim 1, wherein said selecting includes sub-sampling said first or second sequence data samples to a rate of one sample per chip.

14. A computer readable medium containing instructions which, when executed on a computer, carry out a process of receiving a sampled DS-CDMA signal, said process comprising:
causing one or more data samples of each of M chips and one or more quantized bits from each selected data sample of the sampled DS-CDMA signal to be stored in a first memory as a data sequence, said data sequence being representative of an in-phase or quadrature component of the sampled DS-CDMA signal;
retrieving said data sequence from said first memory;
processing said data sequence to determine if a signal is present in the DS-CDMA signal; and if a signal is present:
causing a predetermined number of samples of the DS-CDMA signal to be stored in a second memory;
retrieving said predetermined number of samples of the sampled DS-CDMA signal from said second memory; and
decoding said predetermined number of samples of the sampled DS-CDMA signal to recover information from the sampled DS-CDMA signal.

15. A computer readable medium containing instructions as in claim 14, wherein said processing said data sequence to determine is a signal is present comprises:
coherently averaging said data sequence over one or more information bits to obtain an averaged data sequence of length M;
correlating said averaged data sequence with a pseudo-noise code of length M samples to obtain a correlation output; and
comparing said correlation output with a predetermined threshold level to determine if a signal is present in the DS-CDMA signal.

16. A computer readable medium containing instructions as in claim 15, wherein the $n^{th}$ element of said data sequence is denoted by c(n) and coherently averaging comprises:
calculating the sums $$\sum_{p=0}^{P-1} c(k + M \cdot S \cdot p),$$

wherein P is the number of averages, S is the number of samples per chip, M is the number of chips per information bit, k is the remainder portion of n/(MS) and p is the integer portion of n/(MS); and
quantizing each sum to the one or more quantized bits of each selected data sample.

17. A computer readable medium containing instructions as in claim 15, wherein said correlating said averaged data sequence with a pseudo-noise code comprises;
storing said averaged data sequence as a data bit pattern;
storing said pseudo-noise sequence as a pseudo-noise bit pattern;
performing a bit-wise "exclusive-or" operation between said data bit pattern and said pseudo-noise bit pattern; and
calculating, from the result of said "exclusive-or" operation, the number of bits that match between said data bit pattern and said pseudo-noise bit pattern.

18. A device for processing a sampled DS-CDMA signal, wherein the device is directed by a computer program that is embedded in at least one of:
(a) a memory;
(b) an application specific integrated circuit;
(c) a digital signal processor; and
(d) a field programmable gate array, and the computer program, when executed, carries out the process of:
causing a plurality of data samples of each of M chips and a plurality of quantized bits from each selected data sample of the sampled DS-CDMA signal to be stored in a first memory as a data sequence, said data sequence being representative of an in-phase or quadrature component of the sampled DS-CDMA signal;
retrieving said data sequence from said first memory;
processing said data sequence to determine if a signal is present in the sampled DS-CDMA signal; and if a signal is present:
causing a predetermined number of samples of the sampled DS-CDMA signal to be stored in a second memory;
retrieving said predetermined number of samples of the sampled DS-CDMA signal from said second memory; and decoding a predetermined number of samples of the sampled DS-CDMA signal to recover information from the sampled DS-CDMA signal.

19. A device for processing a sampled DS-CDMA signal as in claim 18, wherein said sampled DS-CDMA signal has in-phase and quadrature components, said device further comprising:
a first analog to digital converter for receiving an in-phase component of a DS-CDMA waveform and producing the in-phase component of the sampled DS-CDMA signal; and
a second analog to digital converter for receiving a quadrature component of a DS-CDMA waveform and producing the quadrature component of the sampled DS-CDMA signal.

20. A device for processing a sampled DS-CDMA signal as in claim 19, further comprising:
a means for extracting a plurality of data samples of each of the M chips and a plurality of quantized bits from each selected data sample of said in-phase or quadrature component of the sampled DS-CDMA signal to produce said data stream.

21. A device for processing a sampled DS-CDMA signal as in claim 18, wherein said processing said data sequence to determine is a signal is present comprises:
coherently averaging said data sequence over one or more information bits to obtain an averaged data sequence of length M;
correlating said averaged data sequence with a pseudo-noise code to obtain a correlation output; and
comparing said correlation output with a predetermined threshold level to determine is signal is present in the DS-CDMA signal.

22. A device for processing a sampled DS-CDMA signal as in claim 21, wherein the $n^{th}$ element of said data sequence is denoted by c(n) and wherein said coherently averaging comprises:
calculating the sums $$\sum_{p=0}^{P-1} c(k + M \cdot S \cdot p),$$

wherein P is the number of averages, S is the number of samples per chip, M is the number of chips per information bit, k is the remainder portion of n/(MS) and p is the integer portion of c/(MS); and
quantizing each sum to the one or more quantized bits of each selected data sample.

23. A device for processing a sampled DS-CDMA signal as in claim 21, wherein the $n^{th}$ element of said data sequence is denoted by c(n), wherein said sampled DS-CDMA signal includes a training sequence and wherein said coherently averaging comprises:
calculating the sums $$\sum_{p=0}^{P-1} c(k + M \cdot S \cdot p)pn(k, b(p)),$$

where P is the number of averages, S is the number of samples per chip, M is the number of chips per information bit, k is the remainder portion of n/(MS), p is the integer portion of n/(MS), b(p) is the value of the $p^{th}$ bit in the training sequence and pn(k,b(p)) is the value of the $k^{th}$ chip of the pseudo-noise code for the bit b(p); and
quantizing each sum to the one or more quantized bits of each selected data sample.

24. A device for processing a sampled DS-CDMA signal as in claim 21, wherein said correlating said averaged darn sequence with a pseudo-noise code comprises:
storing said averaged data sequence as a data bit pattern;
storing said pseudo-noise sequence as a pseudo-noise bit pattern;
performing a bit-wise "exclusive-or" operation between said data bit pattern and said pseudo-noise bit pattern;
calculating from the result of said "exclusive-or" operation the number of bits that match between said data bit pattern and said pseudo-noise bit pattern.

* * * * *